(12) United States Patent
Yahata

(10) Patent No.: US 8,717,449 B2
(45) Date of Patent: May 6, 2014

(54) IMAGE SYNTHESIZING APPARATUS, IMAGE RECORDING METHOD, AND RECORDING MEDIUM

(71) Applicant: Casio Computer Co., Ltd., Tokyo (JP)

(72) Inventor: Takashi Yahata, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/675,477

(22) Filed: Nov. 13, 2012

(65) Prior Publication Data

US 2013/0120616 A1 May 16, 2013

(30) Foreign Application Priority Data

Nov. 14, 2011 (JP) .................................. 2011-248251

(51) Int. Cl.
*H04N 5/225* (2006.01)

(52) U.S. Cl.
USPC ......................................... 348/218.1; 348/239

(58) Field of Classification Search
USPC .............. 348/578–600, 563–565, 239, 218.1; 382/274
See application file for complete search history.

(56) References Cited

U.S. PATENT DOCUMENTS

| 7,952,614 | B2 | 5/2011 | Lee |
| 8,213,744 | B2 | 7/2012 | Yano |
| 2005/0122412 | A1* | 6/2005 | Shirakawa et al. ........... 348/239 |
| 2009/0096859 | A1* | 4/2009 | Jeong .......................... 348/14.02 |
| 2009/0225201 | A1* | 9/2009 | Abe et al. ...................... 348/241 |
| 2011/0243451 | A1* | 10/2011 | Oyaizu ......................... 382/190 |
| 2012/0050486 | A1* | 3/2012 | Sasaki ............................. 348/46 |
| 2012/0086829 | A1* | 4/2012 | Hohjoh ...................... 348/223.1 |
| 2012/0293565 | A1* | 11/2012 | Mito ............................. 345/690 |

FOREIGN PATENT DOCUMENTS

| JP | 2006-148550 A | 6/2006 |
| JP | 2008-293185 A | 12/2008 |
| JP | 2009-118483 A | 5/2009 |
| JP | 2011-210139 A | 10/2011 |

* cited by examiner

*Primary Examiner* — Nhan T Tran
*Assistant Examiner* — Chan Nguyen
(74) *Attorney, Agent, or Firm* — Holtz, Holtz, Goodman & Chick, PC

(57) ABSTRACT

An image capturing unit 1 acquires a plurality of images being temporally continuous. Based on external operations from a key input unit 4, a control unit 9 selects an image serving as reference of synthesis, from the plurality of images acquired by the image capturing unit 1. An image processing unit 10 compares the reference image selected by the key input unit 4 with other images acquired by the image capturing unit 1, and detects an image with a difference value being higher than a predetermined threshold value as a result of such comparison. The image processing unit 10 sets a synthetic rate, based on the image thus detected. A synthesis unit 11 generates a single image by executing synthesis of the plurality of acquired images including the image serving as reference, by using the synthetic rate that is set by the image processing unit 10.

6 Claims, 3 Drawing Sheets

PA

B1
B2
B3
PB

C1
C2
C3
PC

D1
D2
D3
PD

E1
E2
E3
PE

IMAGE SYNTHESIZING APPARATUS, IMAGE RECORDING METHOD, AND RECORDING MEDIUM

This application is based on and claims the benefit of priority from Japanese Patent Application No. 2011-248251, respectively filed on 14 Nov. 2011, the content of which is incorporated herein by reference.

BACKGROUND OF THE INVENTION

1. Field of the Invention

The present invention relates to an image synthesizing apparatus, an image recording method, and a recording medium.

2. Related Art

Conventionally, a technique has been known, in which additive synthesis is executed on pixels of continuously captured images, thereby generating an image with sufficient brightness for recording, even in a dark photographic environment with a low level of light such as a night view.

Japanese Unexamined Patent Application, Publication No. 2006-148550 discloses an image synthesis technique for correcting blurring in an image capturing field angle, by continuously capturing images and synthesizing the images.

Incidentally, when a stroboscopic flash unexpectedly emits light during the process of exposure and changes the brightness, an image with uneven brightness may be acquired.

If such an image is used for additive synthesis, the change in brightness still remains in a synthetic result, and thus a synthetic image with uneven brightness is eventually generated.

The present invention has been made in view of such problems, and an object of the present invention is to prevent a synthetic result from being affected by an acquired image with uneven brightness.

SUMMARY OF THE INVENTION

In order to achieve the above object, an aspect of the present invention is characterized by including: an image acquisition unit that acquires a plurality of images being temporally continuous; a selection unit that selects a single image serving as reference of brightness, from the plurality of images acquired by the image acquisition unit; a detection unit that compares the single image selected by the selection unit with other images acquired by the image acquisition unit, and detects an image with a difference value being higher than a predetermined threshold value as a result of such comparison; a setting unit that sets a synthetic rate, based on the image detected by the detection unit; and an image generation unit that generates an image by executing synthesis of the plurality of images acquired by the image acquisition unit including the image detected by the detection unit, by using the synthetic rate that is set by the setting unit. In order to achieve the above object, another aspect of the present invention is characterized by including: an image acquisition step of acquiring a plurality of images being temporally continuous; a selection step of selecting a single image serving as reference of brightness, from the plurality of images acquired in the image acquisition step; a detection step of comparing the single image selected in the selection step with other images acquired in the image acquisition step, and detecting an image with a difference value being higher than a predetermined threshold value as a result of such comparison; a setting step of setting a synthetic rate, based on the image detected in the detection step; and an image generation step of generating a single image by executing synthesis of the plurality of images acquired in the image acquisition step including the image detected in the detection step, by using the synthetic rate that is set in the setting step. In order to achieve the above object, still another aspect of the present invention is characterized by causing a computer, which controls an image synthesizing apparatus for generating synthetic image data, to execute image synthesis processing including: an image acquisition function of acquiring a plurality of images being temporally continuous; a selection function of selecting a single image serving as reference of brightness, from the plurality of images acquired by the image acquisition function; a detection function of comparing the single image selected by the selection function with other images acquired by the image acquisition function, and detecting an image with a difference value being higher than a predetermined threshold value as a result of such comparison; a setting function of setting a synthetic rate, based on the image detected by the detection function; and an image generation function of generating an image by executing synthesis of the plurality of images acquired by the image acquisition function including the image detected by the detection function, by using the synthetic rate that is set by the setting function.

DETAILED DESCRIPTION OF THE PREFERRED EMBODIMENT

Figure 1:
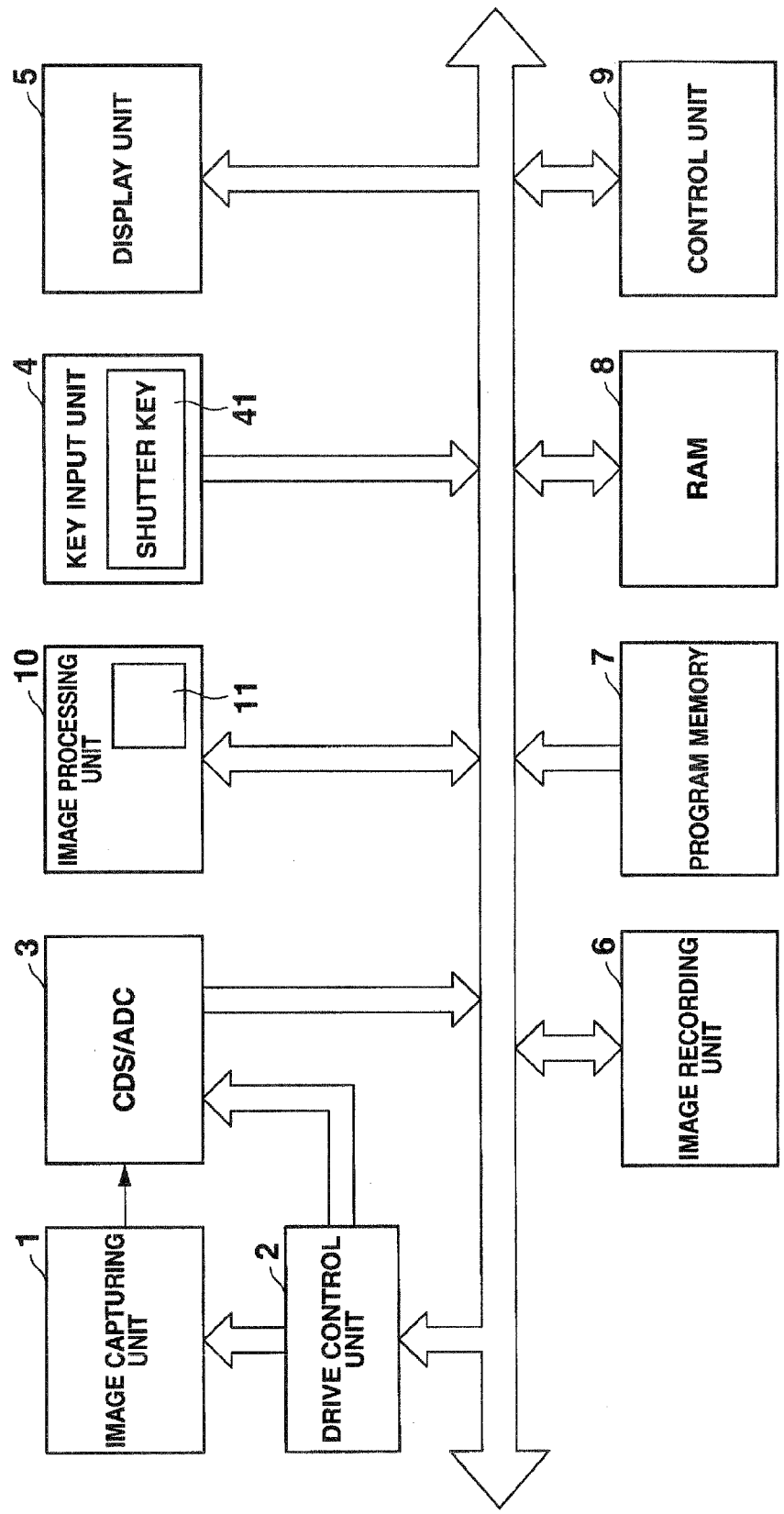
FIG. 1 is a circuit block diagram of an image capturing apparatus, to which an embodiment of the present invention is applied.

An embodiment of the present invention is hereinafter described with reference to the drawings. FIG. 1 is a circuit configuration diagram of an image capturing apparatus including an image processing device according to an embodiment of the present invention. The image capturing apparatus has a function of reading an image signal by a rolling shutter scheme, and includes a drive control unit 2, a CDS/ADC 3, a key input unit 4, a display unit 5, an image recording unit 6, program memory 7, RAM 8, a control unit 9, and an image processing unit 10. These are connected via a bus line. The key input unit 4 includes a shutter key 41 for detecting a recording instruction of a photographer; and the image processing unit 10 includes a synthesis unit 11.

In FIG. 1, the image capturing unit 1 has a built-in image sensor such as a CMOS; a built-in RGB color filter provided on the image sensor; and a built-in driver that retains light intensity as charge accumulation for a certain period of time in accordance with control by the drive control unit 2 so as to be output as an analog image capturing signal to the CDS/ADC 3. A plurality of images (color images) are acquired by detecting image capturing instructions of the photographer, the instructions being routed through the shutter key 41, the control unit 9 and the drive control unit 2.

The CDS/ADC 3 is configured by a CDS, a gain adjustment amplifier (AGC), an A/D converter (ADC), etc. An analog image capturing signal of an optical image of a subject is output from the image capturing unit 1, and is input into the CDS that retains the image capturing signal thus input. The gain adjustment amplifier amplifies the image capturing signal. The A/D converter (ADC) converts the image capturing signal thus amplified into a digital image capturing signal. Control involved with adjustment of the gain adjustment amplifier is also executed based on an instruction from the drive control unit 2. Therefore, even if a plurality of images are acquired under the same exposure condition (shutter speed or diaphragm stop), the plurality of images can be generated under different conditions by sequentially changing RGB of the gain adjustment amplifier and tints of the images.

Although the drive control unit 2 executes control involved with the gain adjustment amplifier in the present embodiment, the present invention is not limited thereto. For example, the control unit 9 may execute the control.

In addition to the shutter key 41, the key input unit 4 includes various keys for detecting switchover to a photography mode for acquiring and recording an image according to the present invention, keys for switching display, etc.

The display unit 5 has a function of displaying a synthesized image. After executing synthesis processing according to the present invention, the image recording unit 6 stores image data (image file) coded by a JPEG scheme. The program memory 7 stores a program to be executed by the control unit 9 and the image processing unit 10; and the control unit 9 reads the program as necessary. The RAM 8 has a function of temporarily storing data in process, which is generated in each processing. The control unit 9 controls processing operations of the entirety of the image capturing apparatus. In addition to executing encoding/decoding processing of image data, the image processing unit 10 includes the synthesis unit 11 corresponding to a characteristic feature of the present invention.

More specifically, the synthesis unit 11 executes image synthesis of a single reference image selected from continuously captured images, and a synthetic image generated by additive synthesis of the continuously captured images. In addition, the synthesis unit 11 uses a map (to be described below) for the synthetic image as a transparence intensity map ($\alpha$ map) corresponding to a difference area, thereby executing synthesis while changing a synthetic rate for each pixel region, and reducing an influence due to uneven brightness.

Figure 2:
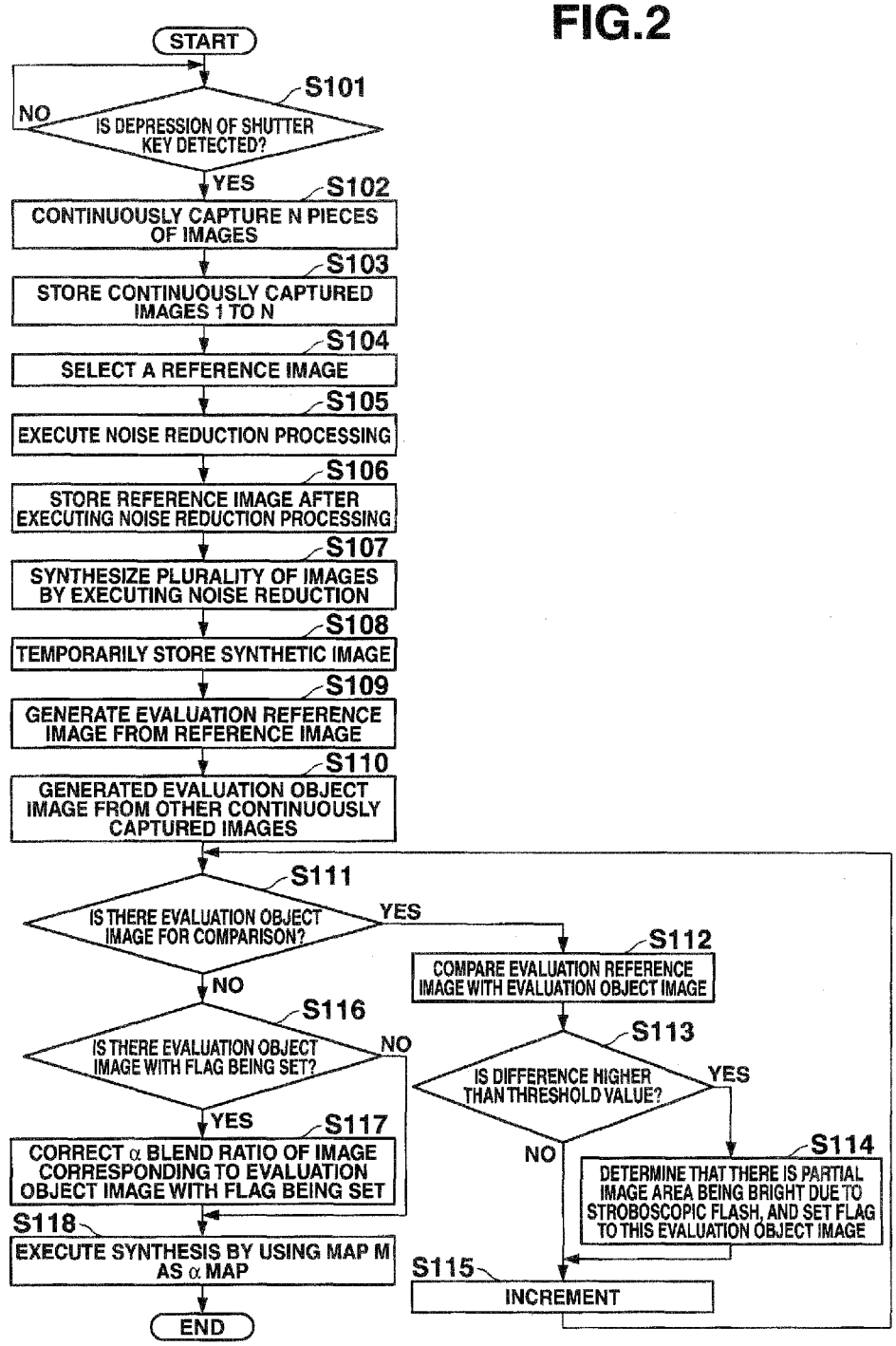
FIG. 2 is a flowchart showing a processing procedure in the image capturing apparatus.

Next, descriptions are provided for operations in the present embodiment. When the user operates a mode button provided to the key input unit 4 to set a photography mode according to the present embodiment, the control unit 9 reads a program from the program memory 7 to initiate processing as shown in the flowchart of FIG. 2.

More specifically, the control unit 9 determines whether depression of the shutter key 41 is detected (Step S101). In a case in which depression of the shutter key 41 is detected, the control unit 9 controls the drive control unit 2 to continuously capture N pieces of images (Step S102). Subsequently, based on image data obtained by the continuous capturing, an image data group of the continuously captured images in the YUV format expressed in color space information of brightness and color difference is generated and stored in the RAM 8 (Step S103).

Therefore, for example, in a case in which the N pieces of continuously captured images are six pieces, continuously captured images P1 to P6 are stored in the RAM 8. It is assumed that blurring of the continuously captured images P1 to P6 is corrected by a well-known technique (a field angle correction technique using CCD shift and/or lens shift).

Next, a reference image is selected from the continuously captured images (Step S104). The reference image is selected based on an external operation by the user. For example, the continuously captured images P1 to P6 are displayed as a list on the display unit 5, and the user selects a single image as a reference image from the continuously captured images P1 to P6 displayed as the list. In the present embodiment, it is assumed that the continuously captured image P3 is selected as a reference image.

Subsequently, noise reduction processing is executed on the image data of the selected reference image by using an LPF (Low-Pass-Filter) (Step S105). The image data of the reference image after executing the noise reduction processing is stored in the RAM 8 (Step S106). Therefore, in this case, as a result of the processing in Steps S105 and S106, the noise reduction processing is executed on the image data of the continuously captured image P3 (reference image), which is then stored into the RAM 8.

The plurality of continuously captured images are synthesized by executing noise reduction (Step S107). In other words, noise reduction and synthesis can be executed together by averaging the image data of the plurality of continuously captured images for each pixel. Equations 1 to 3 for image data averaging calculation for N pieces of continuously captured images are shown as follows. Y_result, U_result and V_result represent information after executing synthesis of brightness and color difference parameters for each pixel.

$$Y\_result = (Y[0] + Y[1] + \ldots + Y[N])/N \quad \text{Equation 1}$$

$$U\_result = (U[0] + U[1] + \ldots + U[N])/N \quad \text{Equation 2}$$

$$V\_result = (V[0] + V[1] + \ldots + V[N])/N \quad \text{Equation 3}$$

As long as a noise reduction effect is achieved by using a plurality of continuously captured images, the synthetic method is not limited to the averaging, and may be any other processing method. Image data of a synthetic image of all the continuously captured images after executing the noise reduction is stored into the RAM 8 (Step S108).

Therefore, when the processing in Step S108 is completed, the following image data is stored into the RAM 8.
(1) Image data of each of the continuously captured images;
(2) Image data of the reference image after executing the noise reduction processing; and
(3) Image data of the synthetic image after executing the noise reduction processing.

Next, an evaluation reference image is generated from the reference image selected in Step S104 (Step S109). Here, the evaluation reference image is, for example, a reduced image by reducing the reference image to 32×32 pixels. Subsequently, an evaluation object image is generated from the continuously captured images other than the reference image selected in Step S104 (Step S110). Here, the evaluation object image is, for example, a reduced image by reducing the reference image to 32×32 pixels.

In the following processing in Steps S111 to S115, the evaluation reference image and each of the continuously captured images are compared and evaluated for difference in each pixel. In this case, determination is firstly made as to whether there is an evaluation object image (continuously captured image) that is not compared and evaluated yet (Step S111). If there is an evaluation object image (continuously captured image) that is not compared and evaluated yet, the evaluation object image is compared with the evaluation object image that is not compared and evaluated yet (Step S112).

After such comparison, determination is made as to whether difference between the evaluation object image and the evaluation reference image is equal to or higher than a threshold value (Step S113). More specifically, the control unit 9 obtains absolute value difference between the (2) image data of the reference image after executing the noise reduction processing and the (1) image data of the evaluation object image (each of the continuously captured images composed of reduced images), for each pixel of the (1) image data of each of the continuously captured images, as shown in Equations 4 to 6 below.

More specifically, Equations below assume the following.

Y_Base_Nr, U_Base_Nr, V_Base_Nr: each YUV parameter of the (2) reference image data after executing the noise reduction.

Y[n], U[n], V[n]: each YUV parameter of the Nth image data.

N: the number of synthesized images.

fMax( ): maximum value enumeration function.

fLpf( ): smoothing function.

fEmphasis( ): map enhancement function.

Then, the following Equations are calculated for each pixel of each of the continuously captured images.

$$\text{Diff\_}Y[n] = |Y\_base\_Nr - Y[n]| \quad \text{Equation 4 (absolute value difference of //Y)}$$

$$\text{Diff\_}U[n] = |U\_base\_Nr - U[n]| \quad \text{Equation 5 (absolute value difference of //U)}$$

$$\text{Diff\_}V[n] = |V\_base\_Nr - V[n]| \quad \text{Equation 6 (absolute value difference of //V)}$$

Determination is then made as to whether the absolute value difference is equal to or higher than a predetermined threshold value. In a case in which the difference is not equal to or higher than the threshold value as a result of the determination in Step S113, the evaluation object image is determined to be of image data without uneven brightness, then increment processing is executed (Step S115), and the processing from Step S112 is repeated for the next evaluation object image. In a case in which the difference is equal to or higher than the threshold value as a result of the determination in Step S113, it is determined that the brightness is uneven, and that there is a partial image area being bright, and a flag is set to this evaluation object image (Step S114).

Figure 3A:
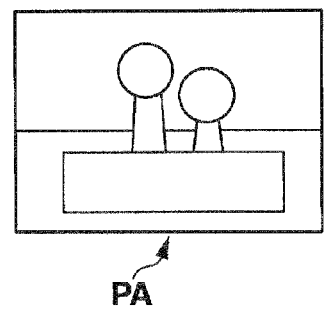
FIG. 3A is a diagram showing an image example in the processing procedure.
Figure 3B:
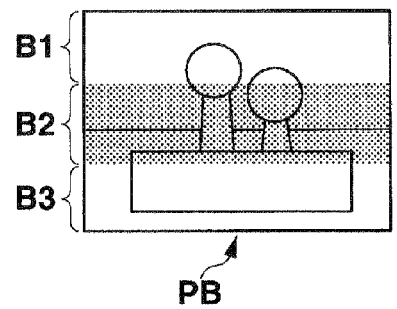
FIG. 3B is a diagram showing an image example in the processing procedure.

In other words, as described above, the image capturing apparatus according to the present embodiment has the function of reading an image signal by the rolling shutter scheme. Therefore, in a case in which brightness temporarily changes in the photographic environment during the process of continuous capturing, not only an image without uneven brightness as shown in FIG. 3A, but also an image with uneven brightness as shown in FIG. 3B may be acquired. The image shown in FIG. 3B is an image with uneven brightness, in which only a partial area B2 (a hatching area) is brighter than other areas B1 and B3. Therefore, when the image shown in FIG. 3A is a comparison reference image PA, and the image shown in FIG. 3B is a comparison object image PB, since the absolute value difference is equal to or higher than the predetermined threshold value in only the area B2, the determination in Step S113 is YES, and a flag is set to the comparison object image PB.

In this manner, when the processing from Steps S111 to S115 is repeated for the number of times the images are continuously captured, there will be no evaluation object image as a comparison object, and the determination in Step S111 will become NO. Accordingly, the control unit 9 advances the processing from Step S111 to S116, and determines whether there is an evaluation object image (continuously captured image) with a flag being set as a result of executing the processing in Step S114. In a case in which there is no evaluation object image with a flag being set, the processing advances to Step S118 without executing processing in Step S117, and an α map is used to execute synthesis.

More specifically, in Equations 4 to 6, an image area with larger difference can be considered to be an image area with uneven brightness, an image area with maximum difference is selected (with maximum difference for each corresponding pixel of the continuously captured images) as shown in Equation 7 below.

$$\text{Diff}[n] = f\text{Max}(\text{Diff\_}Y[n], \text{Diff\_}U[n], \text{Diff\_}V[n]) \quad \text{Equation 7}$$

Next, as shown in Equation 8 below, processing is executed for averaging maximum difference of each of the continuously captured images other than the reference image.

$$\text{Ave\_Diff} = (\text{Diff}[0] + \text{Diff}[1] + \ldots + \text{Diff}[N])/N - 1 \quad \text{Equation 8}$$

Furthermore, smoothing processing is executed as shown in Equation 9 below.

$$\text{Ave\_Diff\_}Lpf = f\text{Lpf}(\text{Ave\_Diff}) \quad \text{Equation 9}$$

A map M is generated by the smoothing processing. The map M is composed of an area where α=0 allowing complete transparence, and an area where α=255 allowing no transparence.

Continuously, enhancement processing is executed to increase the contrast of the map M as shown in Equation 10 below.

$$\text{Map\_Move} = f\text{Emphasis}(\text{Ave\_Diff\_}Lpf) \quad \text{Equation 10}$$

The enhancement processing increases the contrast of an area where the image of the moving body overlaps in the map M.

Eventually, the map M ((Map_Move [0~255]: 0=there is no moving body) is used as the α map to synthesize the (2) image data of the reference image after executing the noise reduction processing and the (3) image data of the synthetic image after executing the noise reduction processing (Step S118).

Each YUV parameter (Y_result, U_result, V_result) of each synthesized pixel is expressed in Equations 11 to 13 below.

$$Y\_result = (Y\_Nr\_Mix \times (255 - \text{Map\_Move}) + Y\_Base\_Nr \times \text{Map\_Move})/255 \quad \text{Equation 11}$$

$$U\_result = (U\_Nr\_Mix \times (255 - \text{Map\_Move}) + U\_Base\_Nr \times \text{Map\_Move})/255 \quad \text{Equation 12}$$

$$V\_result = (V\_Nr\_Mix \times (255 - \text{Map\_Move}) + V\_Base\_Nr \times \text{Map\_Move})/255 \quad \text{Equation 13}$$

As a result, image data of a synthetic image is generated.

However, in a case in which there is an evaluation object image with a flag being set as a result of the determination in Step S116, an α0 blend rate is corrected for the image corresponding to the evaluation object image with the flag being set (Step S117), and the processing in Step S118 is executed thereafter.

More specifically, the comparison object image PB shown in FIG. 3B is an image, in which only the partial area B2 is brighter than the other areas B1 and B3, and a flag is set to the comparison object image PB in the processing in Step S114. Therefore, since the comparison object image PB with the flag being set exists, the processing advances from Step S116 to S117, and the α blend rate is corrected for the image corresponding to the evaluation object image PB (Step S117).

Figure 3C:
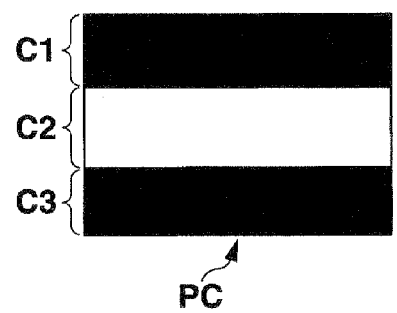
FIG. 3C is a diagram showing an image example in the processing procedure.

In other words, when an image PC shown in FIG. 3C is described as an example, in the image PC, only a partial area C2 corresponding to the area B2 of the evaluation object image PB is brighter than other areas C1 and C3 corresponding to the areas B1 and B3, respectively.

Figure 3D:
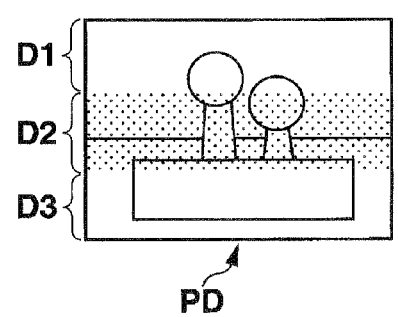
FIG. 3D is a diagram showing an image example in the processing procedure.

Therefore, the continuously captured image PC with only the area C2 being bright due to the flash effect is synthesized in the synthetic image of all the continuously captured images after executing the noise reduction processing ((3) YUV image data of the synthetic image after executing the noise reduction processing). Therefore, when such a synthetic image is used as it is, and the map M is used as the α map to synthesize (2) image data of the reference image after executing the noise reduction processing and (3) image data of the synthetic image after executing the noise reduction processing, the brightness components of the area C2 are included in "(3) image data of the synthetic image after executing the noise reduction processing". Therefore, as shown in FIG. 3D, a synthetic image PD is generated, in which only a partial area D2 corresponding to the area C2 of the continuously captured image PC is brighter than other areas D1 and D3 corresponding to the areas C1 and C3, respectively.

Accordingly, in the present embodiment, in Step S117, the α blend rate is corrected for the image corresponding to the evaluation object image with a flag being set. More specifically, the processing similar to Step S107 is executed by employing the areas C1 and C3 without employing the area C2 of the image PC, and the plurality of continuously captured images are synthesized by executing the noise reduction processing. As a result, "(3) image data of the synthetic image after executing the noise reduction processing" is generated, in which the area C2 of the image PC is not employed in the plurality of continuously captured images.

By using "(3) image data of the synthetic image after executing the noise reduction processing" that is newly generated in the processing in Step S117, the map M is used as the α map in Step S118 to synthesize (2) image data of the reference image after executing the noise reduction processing and (3) image data of the synthetic image after executing the noise reduction processing.

Figure 3E:
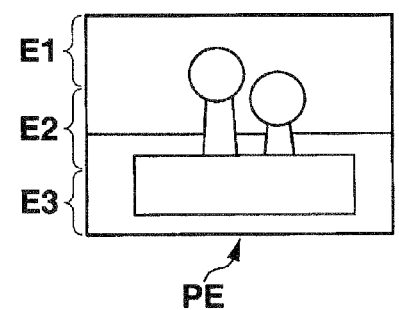
FIG. 3E is a diagram showing an image example in the processing procedure.

At this time, components corresponding to the area C2 of the continuously captured image PC are not included in "(3) image data of the synthetic image after executing the noise reduction processing" that is used for the synthesizing in Step S118. Consequently, as shown in FIG. 3E, a synthetic image PE can be obtained, in which brightness in areas E1, E2 and E3 are the same without any uneven brightness.

Furthermore, as described above, since the smoothing processing is executed in the present embodiment, the synthesis can create a more natural boarder line between a moving body and a background. Moreover, since the processing of increasing the contrast of the map M is executed, residual images (picture ghosting) by blurring a subject in the synthesis processing can also be decreased.

The embodiment of the present invention has been described above, but the present invention should not be limited thereto, and includes the invention according to the claims and the scope equivalent to the claims.

What is claimed is:

1. An image synthesizing apparatus, comprising:
an image acquisition unit that acquires a plurality of images that are temporally continuous;
a selection unit that selects a reference image from the plurality of images acquired by the image acquisition unit;
a detection unit that compares the reference image selected by the selection unit with other images acquired by the image acquisition unit, and detects an image having an image area with a difference value that is higher than a predetermined threshold value as a result of the comparison;
a setting unit that sets a transparence intensity of the image area in the image detected by the detection unit; and
an image generation unit that generates an image by executing additive synthesis of the plurality of images acquired by the image acquisition unit including the image detected by the detection unit by using the transparence intensity that is set by the setting unit for the image area in the image detected by the detection unit.

2. The image synthesizing apparatus according to claim 1, wherein the detection unit further compares an average value of pixels of the reference image with an average value of pixels of other images acquired by the image acquisition unit.

3. The image synthesizing apparatus according to claim 1, wherein the image acquisition unit includes an image capturing unit.

4. The image synthesizing apparatus according to claim 3, wherein the setting unit sets the transparence intensity based on an irradiation condition of light at a moment of capturing an image signal by the image capturing unit and light and shade difference that occurs due to timing of capturing the image signal by the image capturing unit.

5. A non-transitory computer-readable storage medium having storing a computer-readable program that causes a computer included in an apparatus to implement functions as units comprises:
an image acquisition unit that acquires a plurality of images that are temporally continuous;
a selection unit that selects a reference image from the plurality of images acquired by the image acquisition unit;
a detection unit that compares the reference image selected by the selection unit with other images acquired by the image acquisition unit, and detects an image having an image area with a difference value that is higher than a predetermined threshold value as a result of the comparison;
a setting unit that sets a transparence intensity of the image area in the image detected by the detection unit; and
an image generation unit that generates an image by executing additive synthesis of the plurality of images acquired by the image acquisition unit including the image detected by the detection unit by using the transparence intensity that is set by the setting unit for the image area in the image detected by the detection unit.

6. An image synthesizing apparatus, comprising:
an image acquisition unit that acquires a plurality of images that are temporally continuous;
a selection unit that selects a reference image serving as reference of synthesis, from the plurality of images acquired by the image acquisition unit;
a detection unit that compares the reference image selected by the selection unit with other images acquired by the image acquisition unit, and detects an image with a difference value that is higher than a predetermined threshold value as a result of the comparison;
a setting unit that sets a transparence intensity based on the image detected by the detection unit; and an image generation unit that generates an image by executing additive synthesis of the plurality of images acquired by the image acquisition unit including the image detected by the detection unit by using the transparence intensity that is set by the setting unit;

wherein the image acquisition unit includes an image capturing unit; and wherein the setting unit sets the transparence intensity based on an irradiation condition of light at a moment of capturing an image signal by the image capturing unit and light and shade difference that occurs due to timing of capturing the image signal by the image capturing unit.

* * * * *